Patented July 10, 1928.

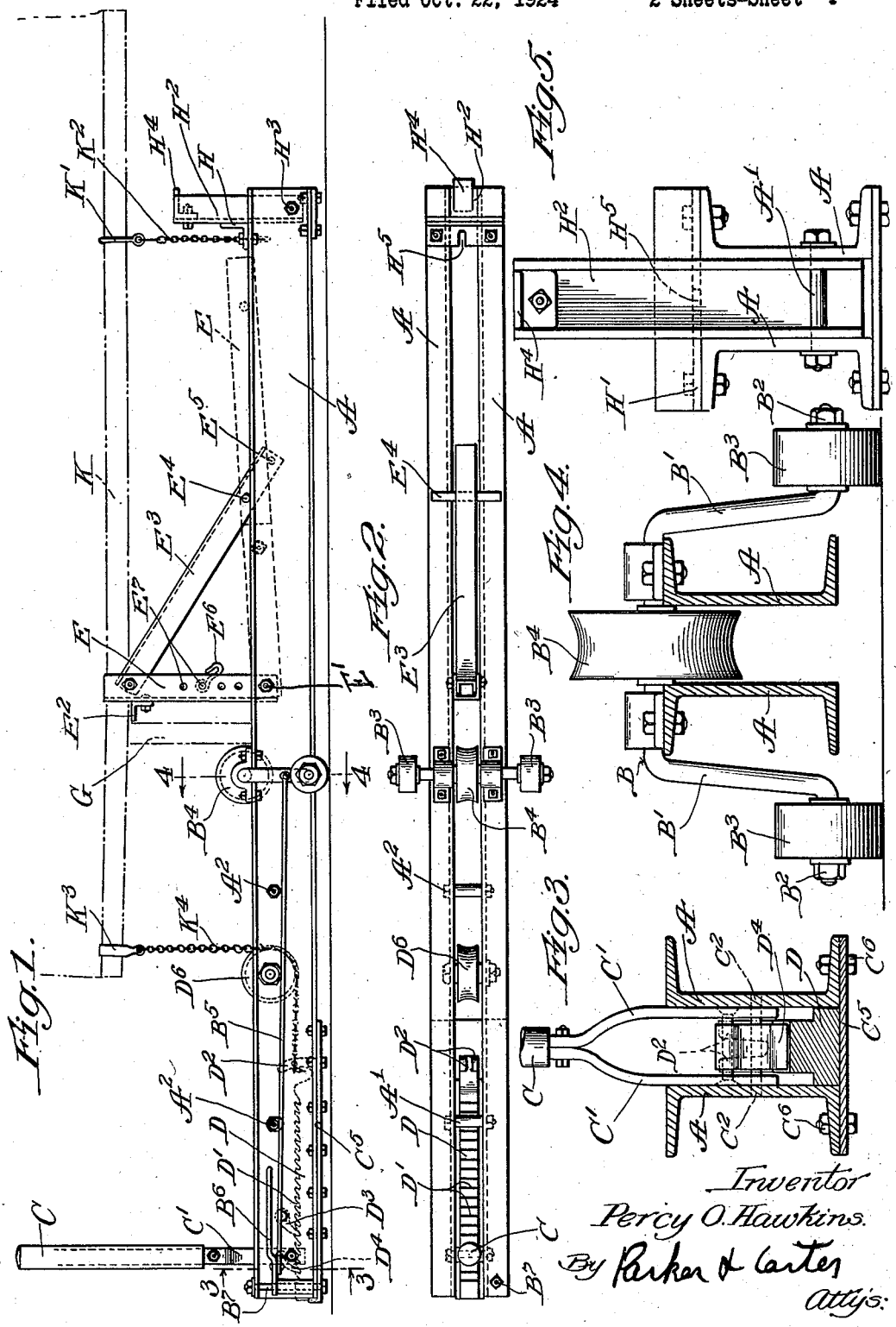

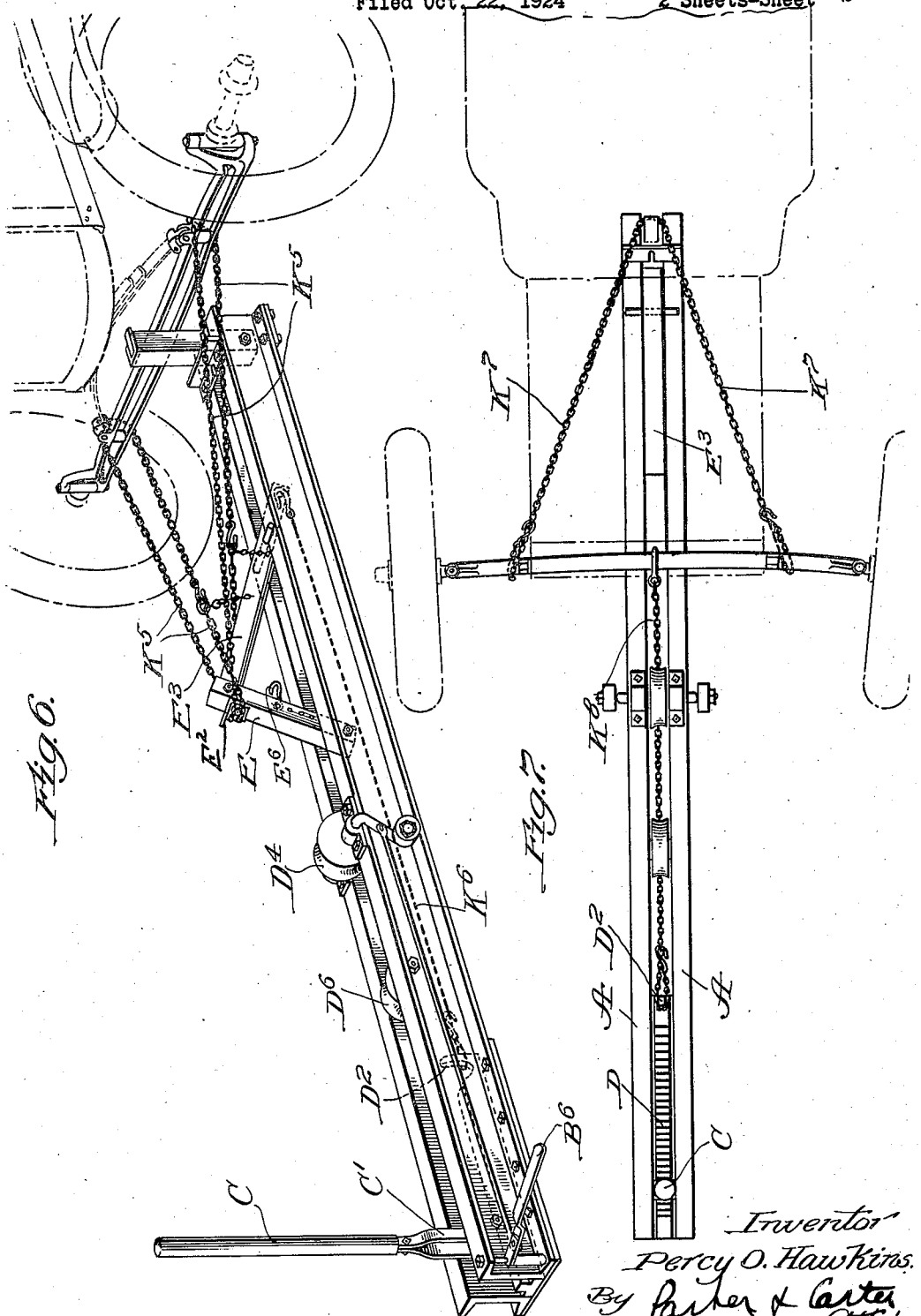

1,676,263

UNITED STATES PATENT OFFICE.

PERCY O. HAWKINS, OF HAMMOND, INDIANA.

AUTOMOBILE FRAME STRAIGHTENER.

Application filed October 22, 1924. Serial No. 745,055.

My invention relates to an automobile frame bender, or to an apparatus for straightening automobile frames. It has for one purpose to provide a means for straightening an automobile frame without dismantling the automobile. Another purpose is the provision of such a bending or straightening means which shall be adapted to straighten the side frame members or the axle or the axle housings or any other of the main structural parts of an automobile which are likely to become bent in service. Other objects will appear in the course of the specifications and claims.

I illustrate my invention more or less diagrammatically in the accompanying drawings wherein:

Figure 1 is a side elevation of my invention;

Fig. 2 is a plan view;

Fig. 3 is a transverse, vertical section along the line 3—3 of Fig. 1;

Fig. 4 is a similar section along the line 4—4 of Fig. 1;

Fig. 5 is an end view;

Fig. 6 is a perspective view of one use of my device; and

Fig. 7 is a plan view illustrating another use of my device.

Like parts are indicated by like symbols throughout the specifications and drawings.

A—A are parallel, longitudinally disposed channel beams which may be spaced apart, for example, by the spacers $A^1$ and are secured together, for example, by the bolts $A^2$ which may pass through said spacers.

Intermediate the ends of the beams A is pivoted a transverse crank element B having the two arms $B^1$ with the outwardly turned portions $B^2$ on which rotate the supporting wheels $B^3$. $B^4$ is a pulley rotating about the crank B and extending between the channel members A—A. $B^5$ is a lever pivoted to one of the arms $B^1$ intermediate its ends and pivoted at its opposite end to the lever $B^6$ the inner end of which is pivoted on the vertical pin $B^7$.

Adjacent the left end of the device, as shown in Figs. 1 and 2, is pivoted the lever C having a forked lower portion comprising the arms C' which are pivoted as at $C^2$ to the channel elements A. The bottoms of the elements A are at that end of the device joined by the bottom plate $C^5$ held in position, for example, by the bolts $C^6$.

Slidably positioned on the plate $C^5$ is the toothed bar or bulldozing element D, the upper portion of which is broken by a series of rearwardly inclined teeth $D^1$. At its rear end is provided a massive, upturned double hook element $D^2$. $D^3$ is a retaining pawl pivoted between the elements A, and $D^4$ is a feed pawl pivoted between the lever elements $C^1$ slightly above the pivot point of the lever itself. $D^5$ is a pulley pivoted between the elements A adjacent the inner end of the toothed bar D.

Adjacent the middle of the device is positioned a jack comprising an element E pivoted as at $E^1$ between the members A and provided at its top with the transverse angle iron supporting ledge $E^2$. Adjacent the top of the member E is the cooperating jack member $E^3$ the lower end of which is provided with a cross pin $E^4$ adapted to ride upon the upper flanges of the channel bars A. The member $E^3$ (which is also of channel stock, is provided with a second cross pin $E^5$ adjacent its end. $E^6$ is a securing hook positioned on the element E and adjustable along the adjusting apertures $E^7$.

G, indicated in dotted lines in Fig. 1, represents a fixed block of wood or other material which may, under some circumstances, be used to take the place of the jack E, the jack elements E and $E^3$ being at such time folded down into the position shown in dotted lines in Fig. 1.

At the right end of the device, as shown in Figs. 1 and 2, I position a cross bar H which may be bolted to the tops of the members A, as at $H^1$. $H^2$ is a vertical member pivoted as at $H^3$ between the elements A and adapted to take the position shown in Fig. 1. It is provided at its upper end with a hook $H^4$, and the cross bar H is centrally notched as at $H^5$.

It will be realized that while I have shown a practical and operative device, nevertheless, many changes in size, shape, number and disposition of the parts may be made without departing from the spirit of the invention and I, therefore, wish my description and drawings to be taken as in a broad sense illustrative rather than as limiting me to the specific features herein described and shown.

The use and operation of my invention are as follows:

It frequently happens that light automobiles, and particularly Fords, suffer accidents and collisions of various kinds which bend the side frame members or the axles, or the axle housings or other parts of the automobile. I provide a mechanism for straightening the members bent by such accidents without dismantling the car.

Since the various members may be bent in a variety of ways, I cannot indicate all the various uses to which my device may be put. I describe or show, however, some of the more important.

It often happens that the side frame members are upwardly bent as shown in dotted lines in Fig. 1, K indicating the side frame members. In order to remedy this condition, I wheel my frame-bending device into position beneath the automobile, the wheels or rollers $B^3$ serving to make this easy. When the mechanism is in position I draw the wheels from the floor by pulling on the lever $B^6$ and thus rotating the crank B and lifting the arms $B^1$. I then position a wooden block G to provide a compression member between the side elements A and the intermediate portion of the frame member. It will be understood that when this block is used the jack members E and $E^3$ are folded to the position shown in dotted line in Fig. 1. The block G being positioned, I secure any suitable hook $K^1$ about the right end of the frame member as shown in Fig. 1 and catch the chain $K^2$, which is secured to it, in the notch $H^5$, drawing the chain as tightly as possible. The size of the notch $H^5$ is such that the link of the chain fits it snugly and the succeeding link, being positioned transversely in relation to the link fitted in the notch, serves to prevent upward movement of the chain. To the opposite end of the frame I secure the hook $K^3$ to which is secured the chain $K^4$ the opposite end of which is caught in the double hook $D^2$ on the toothed bar D, the chain passing around the pulley $D^6$. The hook $K^3$ may be made with a thin, flat point in order to penetrate between frame K and its overlying fender without necessitating the penetration or the removal of the fender. When the block G and the two hooks are in position, it will be observed that the frame member has a fixed tension connection $K^2$ and a fixed compression connection G between it and the straightening device. All that remains is to increase the tension along the chain $K^4$ and the frame member will be straightened. This increase in tension is provided by the manual operation of the lever C; and it is observed that the exertion of a relatively small pressure against the top of the lever C to move it through a considerable arc is transformed into a very powerful pull along the chain $K^4$ exerted to advance the chain and to draw down the end of the frame a slight distance. The retaining pawl $D^3$ prevents rearward movement of the bar D when pressure against the lever C is released and the lever may be moved back for a second stroke.

Fig. 6 illustrates the straightening of the front axle of a Ford which has been forwardly bent, that is, with the center of the axle in front of the ends. I position my device with the vertical member $H^2$ opposed to the central portion of the axle. I loop the chain $K^5$ about the ends of the axle and about the cross ledge $E^2$ on the jack member E, the member E being adjusted about as shown in Fig. 6, with the cross pin $E^4$ of the member $E^3$ riding along the members A. I then hook the chain $K^6$ to the lower cross pin $E^5$ and carry it back to the hook $D^2$ on the bar D. Manipulation of the lever C will draw the lower end of the element $E^3$ away from the automobile being straightened and will rotate the member E and thus exert a tension on the chains which connect it to the outer ends of the axle. The result is a very rapid straightening of the axle.

Fig. 7 diagrammatically illustrates the straightening of the front axle when it is bent in the opposite direction, with the ends of the axle in advance of its central portion. I position my straightening device with the vertical member $H^2$ substantially beneath the front seat of the car and loop the chain $K^7$ about it, connecting it with the outer ends of the axle. I then connect another chain $K^8$ to the central portion of the axle and pass it to the hook $D^2$ of the bar D. The ends of the axle are thus kept stationary by the first chain and the tension exerted on the second chain by the lever C draws the center of the axle out even with its ends.

These examples will indicate the various ways in which my device may be used, and it is unnecessary to go into further detail concerning the employment of the device.

I claim:

1. In an automobile frame straightener, a horizontal body member, a jack element pivoted thereto intermediate its ends, a lever mounted on said body member, means for connecting said lever with the automobile frame, comprising a toothed bar slidable along said body member, a flexible member extending from said toothed bar, and means for securing it to the automobile frame.

2. In an automobile frame straightener, a relatively rigid horizontal element, longer than the automobile, a jack pivoted intermediate its ends, a toothed bar slidably mounted along said horizontal element, a lever controlling said bar, and a connection between said bar and said jack.

3. In an automobile frame straightener, a relatively rigid horizontal element, longer than the automobile, a jack pivoted intermediate its ends, a toothed bar slidably mounted along said horizontal element, a lever controlling said bar, a connection between said bar and said jack, an actuating pawl pivoted on the lower end of said lever, and a retaining pawl pivoted on said horizontal element.

4. In an automobile frame straightener, a relatively rigid horizontal element, longer than the automobile, a jack pivoted intermediate its ends, a toothed bar slidably mounted along said horizontal element, a lever controlling said bar, a connection between said bar and said jack, and a pulley mounted on said horizontal element.

5. In an automobile frame straightener, a relatively rigid horizontal element, longer than the automobile, a jack pivoted intermediate its ends, a toothed bar slidably mounted along said horizontal element, a lever controlling said bar, a connection between said bar and said jack, and an upwardly projecting stop member laterally spaced from said jack upon said horizontal element.

6. In an automobile frame straightener, a relatively rigid horizontal element, longer than the automobile, a jack pivoted intermediate its ends, a toothed bar slidably mounted along said horizontal element, a lever controlling said bar, a connection between said bar and said jack, a stop member pivoted on said horizontal element at a point longitudinally spaced from said jack, and a cross bar against which said stop abuts when in an upright position.

7. In an automobile frame straightener, a relatively rigid horizontal element, longer than the automobile, a jack pivoted intermediate its ends, a toothed bar slidably mounted along said horizontal element, a lever controlling said bar, a connection between said bar and said jack, a stop member pivoted on said horizontal element at a point longitudinally spaced from said jack, and a cross bar against which said stop abuts when in an upright position, said cross bar being notched.

8. In an automobile frame straightener, a rigid horizontal element, a jack pivoted intermediate its ends, comprising one jack member pivoted to said horizontal element, and a second jack member pivoted adjacent the outer end of the first, its outer end being slidable along said horizontal element.

9. In an automobile frame straightener, a rigid horizontal element, a jack pivoted intermediate its ends, comprising one jack member pivoted to said horizontal element, and a second jack member pivoted adjacent the outer end of the first, its outer end being slidable along said horizontal element, a lever pivoted on said horizontal element, and a connection between it and the outer end of said second jack member.

10. In an automobile frame straightener, a rigid horizontal element, a jack pivoted intermediate its ends, comprising one jack member pivoted to said horizontal element, and a second jack member pivoted adjacent the outer end of the first, its outer end being slidable along said horizontal element, a lever pivoted on said horizontal element, a connection between it and the outer end of said second jack member, comprising a toothed plate slidable along said horizontal element, and a flexible connection between said plate and the outer end of said second jack element.

11. In an automobile frame straightener, a rigid horizontal element, a jack pivoted intermediate its ends, comprising one jack member pivoted to said horizontal element, and a second jack member pivoted adjacent the outer end of the first, its outer end being slidable along said horizontal element, a lever pivoted on said horizontal element, a connection between it and the outer end of said second jack member, comprising a toothed plate slidable along said horizontal element, and a flexible connection between said plate and the outer end of said second jack element, a pawl on said lever adapted to engage the teeth of said plate, and a retaining pawl pivoted on said horizontal element.

12. In an automobile frame straightener, a relatively rigid horizontal extended element, and a jack positioned thereon, comprising a jack member pivoted to the longitudinal element, and a second jack member pivoted to the outer end of the first, the opposite end of the second being slidable along the horizontal element, and means for moving the outer end of said second jack member longitudinally along said horizontal element.

13. In an automobile frame straightener, a relatively rigid horizontal extended element, a jack positioned thereon, comprising a jack member pivoted to the longitudinal element, and a second jack member pivoted to the outer end of the first, the opposite end of the second being slidable along the horizontal element, means for moving the outer end of said second jack member longitudinally along said horizontal element, and a hook mounted on one of said jack members.

14. In an automobile frame straightener, a relatively rigid horizontal extended element, a jack positioned thereon, comprising a jack member pivoted to the longitudinal element, and a second jack member pivoted to the outer end of the first, the opposite end of the second being slidable along the horizontal element, means for moving the outer end of said second jack member longitudinally along said horizontal element, and a hook mounted on one of said jack members and adjustable therealong.

15. In an automobile frame straightener, a relatively rigid horizontal extended element, a jack positioned thereon, comprising a jack member pivoted to the longitudinal element, and a second jack member pivoted to the outer end of the first, the opposite end of the second being slidable along the horizontal element, and means for moving the outer end of said second jack member longitudinally along said horizontal element, said jack members being adapted to be folded into horizontal position along said horizontal frame element.

16. In an automobile frame straightener, a relatively rigid horizontal extended element, a jack positioned thereon, comprising a jack member pivoted to the longitudinal element, and a second jack member pivoted to the outer end of the first, the opposite end of the second being slidable along the horizontal element, means for moving the outer end of said second jack member longitudinally along said horizontal element, and an upwardly projecting stop longitudinally spaced from said jack along said horizontal element.

17. In an automobile frame straightener, a relatively rigid horizontal extended element, a jack positioned thereon, comprising a jack member pivoted to the longitudinal element, and a second jack member pivoted to the outer end of the first, the opposite end of the second being slidable along the horizontal element, means for moving the outer end of said second jack member longitudinally along said horizontal element, an upwardly projecting stop longitudinally spaced from said jack along said horizontal element, and a hook element positioned on the outer end thereof.

18. In an automobile frame straightener, a relatively rigid horizontal extended element, a jack positioned thereon, comprising a jack member pivoted to the longitudinal element, and a second jack member pivoted to the outer end of the first, the opposite end of the second being slidable along the horizontal element, means for moving the outer end of said second jack member longitudinally along said horizontal element, an upwardly projecting stop pivoted on said horizontal element, and longitudinally spaced from said jack.

19. In an automobile frame straightening mechanism, a main frame member comprising a pair of channel beams secured back to back, spacing means adapted to space them apart, a bottom plate adjacent one end of said beams, a toothed bar slidable along said bottom plate, a lever pivoted to the channel members thereabove, a pawl pivoted on the bottom of said lever and adapted to engage said toothed plate, a retaining pawl pivoted above said plate between said channel beams, a jack positioned on said channel beams, and an operative connection between said jack and said toothed bar.

20. In an automobile frame straightening mechanism, a main frame member comprising a pair of channel beams secured back to back, spacing means adapted to space them apart, a bottom plate adjacent one end of said beams, a toothed bar slidable along said bottom plate, a lever pivoted to the channel beams thereabove, a pawl pivoted on the bottom of said lever and adapted to engage said toothed plate, a retaining pawl pivoted above said plate between said channel beams, a jack positioned on said channel beams, an operative connection between said jack and said toothed bar, said jack comprising an element pivoted between said channel beams, and a second element pivoted to the end of said first element, the end of said second element being slidable along said channel beams.

21. In an automobile frame straightening device, a longitudinal main frame member, a jack positioned thereon and means for operating it, a plurality of wheels adapted to support said device, means for lifting said wheels from contact with the ground, comprising a rotatably mounted shaft, arms extending outwardly therefrom at right angles thereto, wheels mounted on the ends of said arms, and means for rotating said shaft.

22. In an automobile frame straightening device, a longitudinal main frame member, a lever jack positioned thereon and means for operating it comprising a lever pivoted on said frame member, a toothed bar slidable along said frame member, means on said lever for engaging the teeth of said bar, and a flexible connection between said bar and said jack.

23. In an automobile frame straightening device, a longitudinal main frame member, a lever jack positioned thereon and means for operating it comprising a lever pivoted on said frame member, a toothed bar slidable along said frame member, means on said lever for engaging the teeth of said bar, and a flexible connection between said bar and said jack, a plurality of supporting wheels mounted on said frame member, and means for lifting said wheels from contact with the ground.

24. In an automobile frame straightening device, a longitudinal main frame member, a lever jack positioned thereon and means for operating it comprising a lever pivoted on said frame member, a toothed bar slidable along said frame member, means on said lever for engaging the teeth of said bar, a flexible connection between said bar and said jack, a plurality of supporting wheels mounted on said frame member, means for lifting said wheels from contact with the ground, a double hook at the end of said toothed bar, and a flexible connection between said hook and said jack.

25. In an automobile frame straightening device, a longitudinal main frame member, a lever jack positioned thereon and means for operating it comprising a lever pivoted on said frame member, a toothed bar slidable along said frame member, means on said lever for engaging the teeth of said bar, a flexible connection between said bar and said jack, a plurality of supporting wheels mounted on said frame member, means for lifting said wheels from contact with the ground, a double hook at the end of said toothed bar, and a flexible connection between said hook and said jack, comprising a chain adapted to be dropped between the double hook at any point along its length.

26. In an automobile frame straightener, a horizontal body member, frame engaging means projecting upwardly therefrom, a lever pivoted on said body member and adapted to rotate about a horizontal axis transverse thereto, and flexible connecting means interposed between said lever and the automobile frame, comprising a chain one end of which is secured to the lever and the other end of which is adapted to be secured to the automobile frame, and a guiding roller mounted on the horizontal body member.

27. In an automobile frame straightener, a horizontal body member, a jack element pivoted thereto intermediate the ends of the body member, a lever mounted on said body member, a flexible member adapted to be controlled by said lever, means for securing said flexible member to the automobile frame, and means for actuating said lever.

Signed at Chicago, county of Cook and State of Illinois, this 11th day of October, 1924.

PERCY O. HAWKINS.